United States Patent
Ratke et al.

(10) Patent No.: US 7,812,059 B2
(45) Date of Patent: Oct. 12, 2010

(54) PRODUCTION OF AEROGELS CONTAINING FILLERS

(75) Inventors: Lorenz Ratke, St. Augustin (DE); Sabine Brück, Düren (DE)

(73) Assignee: Deutsches Zentrum fur Luft und Raumfahrt e.V., Bonn (DE)

( * ) Notice: Subject to any disclaimer, the term of this patent is extended or adjusted under 35 U.S.C. 154(b) by 138 days.

(21) Appl. No.: 10/582,010

(22) PCT Filed: Nov. 3, 2004

(86) PCT No.: PCT/EP2004/012402

§ 371 (c)(1),
(2), (4) Date: Oct. 15, 2008

(87) PCT Pub. No.: WO2005/056643

PCT Pub. Date: Jun. 23, 2005

(65) Prior Publication Data

US 2009/0036557 A1    Feb. 5, 2009

(30) Foreign Application Priority Data

Dec. 10, 2003 (DE) ................. 103 57 539

(51) Int. Cl.
  *C09K 3/00*     (2006.01)
(52) U.S. Cl. ......................... 516/111; 521/50
(58) Field of Classification Search ........... 516/111
  See application file for complete search history.

(56) References Cited

U.S. PATENT DOCUMENTS

| 4,032,105 A | 6/1977 | Gritzner et al. |
| 5,086,085 A | 2/1992 | Pekala |
| 5,569,513 A | 10/1996 | Fidler et al. |
| 6,083,619 A | 7/2000 | Frank et al. |
| 2004/0077738 A1* | 4/2004 | Field et al. .................. 521/50 |

FOREIGN PATENT DOCUMENTS

| DE | EP 1077097 | * | 2/2001 |
| EP | 1077097 | | 2/2001 |
| EP | 0875905 | | 6/2001 |
| JP | 04081243 | | 3/1992 |
| WO | WO 97/17308 | | 5/1997 |
| WO | WO 03/009227 | | 2/2003 |

OTHER PUBLICATIONS

R.W. Pekala, et al.; "Aerogels derived from multifunctional organic monomers"; Journal of Non-Crystalline Solids 145 (1992) 90-98.
R. W. Pekala, et al.; "Carbon Areogels and Xerogels"; Mat. Res. Soc. Symp. Proc; vol. 270, 1992, Materials Research Society.
R. Petricevic, et al.; "Structure of carbon aerogels near the gelation limit of the resorcinol-formaldehyde precursor"; Journal of Non-Crystalline Solids 225 (1998) 41-45.

* cited by examiner

*Primary Examiner*—Ling-Siu Choi
*Assistant Examiner*—Chun-Cheng Wang
(74) *Attorney, Agent, or Firm*—Harness Dickey & Pierce, PLC

(57) ABSTRACT

The invention relates to a method for producing an aerogel that contains a filler and has an extremely low thermal conductivity. The aerogel moulded body contains an inorganic filler with a thermal conductivity of up to 0.5 $Wm^{-1}K^{-1}$.

11 Claims, No Drawings

PRODUCTION OF AEROGELS CONTAINING FILLERS

The invention relates to a process for the preparation of a filler-containing aerogel having an extremely low thermal conductivity.

Casting in ceramic shell molds and molds of bonded sands is a standard molding technique for preparing precision parts of a wide variety of alloys, especially of aluminum, magnesium, titanium or gray iron casting alloys. By means of modern casting methods, it is possible to effect contour-true casting close to the final shape (J. Sprunk, W. Blank, W. Grossmann, E. Hayschild, H. Rieksmeier, H. G. Rosselnbruch; Feinguβ für alle Industriebereiche, 2nd edition, Zentrale für Gussverwendung, Düsseldorf 1987; K. A. Krekeler, Feingießen, in: Handbuch der Fertigungstechnik Vol. 1., Editors: G. Speer, Hanser Verlag, Munich 1981; W. Tilch, E. Flemming, Formstoffe und Formverfahren, Dt. Verlag für Grundstoffin-dustrie, Leipzig/Stuttgart 1993).

Like with the molding methods, the state of the art of core production is characterized by a wide variety of core molding methods including different types of binder systems and equipments. Foundries which have a large range of models are often required to apply several methods in parallel for process reasons. The focus in the development of new core binder or core mold materials is in the improvement of the specific strength of mold materials while the proportion of binder is reduced to thereby save the economic and ecological resources.

In aluminum casting, special problems which are unknown in iron casting occur during core removal. The lower casting temperatures of aluminum cause only lower temperatures in the core sand, so that the thermal destruction of the binder is lower. Due to this low destruction of the binder bridges, the cores retain a higher strength after casting and are difficult to discharge by mechanical vibration. Especially for narrow cavities, an additional expenditure of time and work is often required for the complete removal of the core sand, which increases the cost.

Thin-walled casts which can warp or bend during the attempted core removal, like a high sand-to-metal ratio, represent a problem which must be solved. The discharging behavior of organically bound cores in aluminum casting depends on their mechanical strength. The discharging behavior was deteriorated proportionally as the strength of the cores increased. The usual way to achieve a good core removing property leads to lower binder proportions which cause the cores to be more easily removed. At the same time, however, the stability of the core is reduced, so that problems such as core breaking or core warping may occur already in the run-up to casting. The sand grains can be sufficiently coated by the binder only down to some minimum limit, so that complete curing becomes difficult. A variety of possibilities were tested to solve the problem of complete and clean core removal, for example, by a variation of the binder types and binder proportions. Not in all cases were these attempts successful. Often, a whole process step in cast production had to be newly defined. This resulted in additional costs for investments, energy and work. If it was possible to safely remove the cores without additional measures, or at least at a significantly lower cost, the productivity of a foundry could be enhanced. In addition, under ecological aspects, the selective retrievability of the mold materials from the mold material cycles and their recycling should be the focus of the developing works.

In order to understand how the destruction and discharging of the core proceed, there must be considered not only the preparation of the cores and molds, but also the way in which they obtain their strength and their thermal properties. The mechanization of the core production set new standards for both single core production and serial machine production. The use of binders based on artificial resins introduced organochemical core technology. It was presented by Croning in 1943, who was the first to use a resin/sand mixture. In the course of their further development, a large number of binder systems, preferably based on artificial resins, could be presented. The requirements of development demanded from organic binder systems are many. Today, high-quality organic binder systems must meet the requirements of cast quality and thus dimensional accuracy and mold quality. What is demanded is a high specific strength in connection with a reduced binder proportion in the mixture of mold materials. The viscosity of the binder must not be too high, for this is the only way to ensure a good dosing and thus a good processing. In addition, the grain surface can be better cross-linked, so that a sufficiently high strength can be achieved. The sensitivity to parameters which affect the dosing and solidification should be low, and a good core disintegration should also be ensured. Economic and ecological aspects, such as the avoiding of pollutant evolution during the processing and casting and favorable conditions in terms of expenditure of material and energy, should also be considered. The demands mentioned above have led to a process development with new binder systems and corresponding equipment.

As set forth above, there are various methods in the foundries for preparing consumable molds and cores. In the field of sand casting, a distinction can be made between sands with artificial resin binders and sands with inorganic binders. In the field of precision casting, ceramic shell molds and organically bound sand cores are employed.

Substantial problems with all kinds or core and mold materials are:

a) Core removal, i.e., removing the core from the cast as simply as possible, completely and without residues.
b) The cores must withstand high thermal stresses. They must not warp, break or otherwise deform during the casting.
c) The solidification of the cast must begin at the core because otherwise pipes would form there.
d) The core materials must be so strong as to withstand the hydrodynamic stresses (shear stresses from viscous forces of the in-flowing metal must not result in detaching of sand grains and sand layers) and thermal stresses and shrinking stresses during the casting and solidification.
e) During the casting, gases which either lead to casting pores in the metal or damage the cast surface (gas blow) must not escape from the core and mold material.
f) Core as well as mold materials must not react chemically with the casting metal.

Today, cores are prepared on so-called core shooting machines, i.e., a flowable mass of sand and binder is shot into the core mold under high pressure and then cured by adding a curing agent (the curing may be effected by adding a chemical or be initiated by shooting into a preheated mold or by microwave). Today, the preparation times for cores are on the order of seconds for mass products, or on the order of minutes for other products.

The mold and core materials available today generally meet these requirements, but problems keep emerging in particular fields of applications, such as in titanium casting, where there are hardly any core materials which do not react with the metal, or in aluminum casting, in which the removing of cores with complex shapes (e.g., undercuts), above all, causes substantial problems. In addition, there are problems in the field of mold materials, because there are hardly any sand/binder systems which enable the casting of thin walls. This is because today's mold material systems have such a high thermal conductivity that the casting metal no longer spreads in thin-walled zones of the mold.

Hollow spaces within the molded part must be preformed stably by using a core. Due to the high thermal and mechanical load to which they are subjected, such cores are usually prepared from plastic-bound ceramic powders. A drawback of the currently usual methods of core production is the fact that the removal of the cores from the molded part is possible only with an extremely high expenditure (e.g., combustion, high-pressure water blasting), the distribution of the sands within the core is inhomogeneous, and crack nuclei exist which may lead to breaking under thermal/mechanical loads, inter alia.

Aerogels are highly porous open-pore oxidic solids which are usually obtained by sol-gel processes from metal alkoxides by polymerization, polycondensation into gels and subsequent supercritical drying. For a few years, it has been possible also to gel plastic materials by sol-gel processes and convert them to a highly porous organic solid by supercritical drying (see, for example, DE 195 23 382 A1, DE 694 09 161 T2 and U.S. Pat. No. 5,086,085). Pyrolysis of such plastic aerogels under a protective gas or vacuum at temperatures of above 1000° C. converts them to carbon aerogels. Like the oxidic aerogels, plastic and carbon aerogels have extremely low effective heat conductivities (on the order of a few $Wm^{-1}K^{-1}$) and are considerably more light-weight. The physical and mechanical properties of plastic and carbon aerogels are documented in the literature (R. W. Pekala, C. T. Alviso, F. M. Kong, S. S. Hulsey, J. Non-Cryst. Solids 145 (1992) 90; R. W. Pekala, C. T. Alviso, Mat. Res. Soc. Symp. Proc. 270 (1992) 3; R. Petricevic, G. Reichenauer, V. Bock, A. Emmerling, J. Fricke, J. Non-Cryst. Solids (1998)). They can be varied within wide limits by varying the starting materials, composition and the preparation method.

EP 1 077 097 A1 describes the use of plastic/carbon aerogels as a core material. The aerogel described here may contain up to 60% of filler. The time to complete gelling is at least one day.

DE 196 06 114 A1 describes various fibers as a filler material for aerogels.

DE 21 23 632 C describes casting cores which consist of porous carbon obtained by carbonization of plastic foam. These cores do not contain fillers.

DE 30 04 466 A1 describes the preparation of a casting core from a mixture of phenol-formaldehyde resin and carbon particles. These particles comprise 99.5% of the core.

U.S. Pat. No. 4,032,105 B describes casting cores which consist of carbon foam. These cores do not contain fillers.

JP 04081243 A describes casting cores which consist of carbon foam. These cores do not contain fillers either.

EP 0 875 905 B1 describes aerogels filled with organic monomers.

U.S. Pat. No. 5,569,513 B describes aerogels filled with polyester or glass fibers, which glass typically has a thermal conductivity of about 1.3 $Wm^{-1}K^{-1}$.

WO 97/17308 A1 describes aerogels filled with glass fibers.

DE 196 06 114 A1 describes aerogels which may also be filled with glass fibers.

WO 03/09227 A1 describes filler-containing aerogels in which the thermal conductivity of the final product is between 6.045 and 0.5 $Wm^{-1}K^{-1}$. Aerogel particles are solidified with the fillers by means of a binder which is not an aerogel. The proportion of the fillers in the overall mixture is about from 10 to 24% by weight.

DE 195 33 564 A1 describes a composite material of aerogel particles with at least one binder and at least one fibrous material. The thermal conductivity of the composite material is from 0.01 to 0.1 $Wm^{-1}K^{-1}$.

U.S. Pat. No. 6,083,619 A includes aerogel particles embedded in an inorganic matrix material with a thermal conductivity of the overall molded part of 0.4 $Wm^{-1}K^{-1}$.

A drawback of the above described prior art in view of this application is the organic nature of the fillers employed and the associated low thermal stability or the too high thermal conductivity of the fillers employed.

Therefore, it is the object of the present invention to provide aerogel-containing molded parts which contain fillers having as low as possible a thermal conductivity.

In a first embodiment, the above object is achieved by an aerogel-containing molded part and/or aerogel molded part containing an inorganic filler having a thermal conductivity of up to 0.5 $Wm^{-1}K^{-1}$.

In particular, a silica aerogel, plastic aerogel or organic aerogel, especially a resorcinol/formaldehyde aerogel (RF aerogel), is suitable as said aerogel. This is particularly advantageous, since plastic aerogels based on resorcinol/formaldehyde having an appropriate composition and appropriate content of basic catalyst can be converted to a microstructured plastic aerogel at temperatures of from 20 to 50° C. without supercritical drying. By selecting the composition, the gelling reaction can be adjusted in such a way, for example, that a high viscosity liquid is formed at first which becomes more solid with time/temperature. Accordingly, the use of an additional binder is not required according to the invention, so that the molded parts according to the invention preferably consist only of the material of the aerogel and the inorganic filler.

Advantageous fillers include hollow bodies, especially hollow spheres, because these have a particularly low thermal conductivity. Preferably, these hollow bodies consist of glass because glass is sufficiently temperature-resistant. All in all, it is particularly advantageous if the thermal conductivity of the fillers is up to 0.1 $Wm^{-1}K^{-1}$ and/or the volume fraction of the filler is from 70% to 90%. It has been found particularly advantageous if the thermal conductivity of the molded part is lower than the thermal conductivity of the filler-free aerogel.

If hollow spheres (Scotchlite™ from 3M™ or E-Spheres™ from Envirospheres™) are bound with conventional binders, the proportion of binder is on the order of from 0.5 to 1% by volume. With the smooth surfaces of the spheres, this means that the strength of the mold and core material is very low as compared with solid sands of quartz or Alodur™ which are bound with the same amount of binder, but have a rough surface and an edgy, fragmented shape. To date, these materials have not yet been employed in casting technology. Further, the effect on the thermal conductivity of the mold material is not the one described by 3M™, for example, in their data sheets for epoxy resins with glass hollow spheres as a filler. For if the hollow spheres are employed as a filler, the matrix is a dense plastic material, and its thermal conductivity is essentially determined by the matrix, with a small influence of the filler. Bound in a mold material with conventional binders (phenol, furan, epoxy resins), the hollow spheres are no longer a filler, but rather the matrix, because they occupy from 70 to 90% of the volume. The binder is per se an insignificant quantity for the thermal conductivity of the overall material. The thermal conductivity of such a material is determined by two effects: solid-state thermal conductivity of the hollow spheres through the contact sites of the spheres and convective heat transport through the air in the pore space of the hollow sphere agglomerate. The first effect corresponds to the thermal conductivity of the pure hollow sphere agglomerate, which is stated to be about 0.1 $Wm^{-1}K^{-1}$ for E-Spheres™ and can be estimated at about 0.05 $Wm^{-1}K^{-1}$ for 3M™ hollow spheres. The heat transport through the cavities in the agglomerate can be estimated. At packing densities of between 70 and 90%, the pores have a diameter of 0.7 to 0.5 times the mean particle diameter. Thus, they are of macroscopic size, i.e., within a range of about 50 to 100 μm. Thus, heat transport in the pores can be described by convective heat transport through the gas phase in the pores. A typical value for the heat-transfer coefficient of resting air is about 30 $Wm^{-1}K^{-1}$. For mold material thicknesses of from 1 to 10 cm, this yields an effective thermal conductivity of from 0.1 to 1 $Wm^{-1}K^{-1}$ (for 30% pore volume). This means that the heat transport in a mold material made of hollow spheres was essentially determined by the gas phase rather than the hollow spheres. Thus, since hollow spheres are poorly bound by conventional binders, the use of hollow spheres as a mold base material for usual casting applications does not result in a technical advantage.

Only the use of aerogels as a binder material changes the situation. The pore space between the hollow spheres is completely filled by the aerogel, so that a free space in which heat transport can occur through the gas phase does not exist between the particles. Since the aerogels have a nanostructure, heat transport by convection does not occur in their pore space. The thermal conductivity of a composite of hollow sphere/aerogel is determined by the thermal conductivity of the aerogel. However, the overall thermal conductivity is lower than that of the aerogel since the hollow spheres are now a filler despite their high volume fraction and have a lower thermal conductivity than the aerogels themselves. Since the hollow spheres are completely enclosed by the aerogel (for high aerogel binder proportions), these mold materials also have a sufficient strength.

Surprisingly, in the experiments with hollow spheres (plastic materials, glass, ceramics), it has been found that the thermal conductivity of the composite with aerogels is lower than that of the fillers and the pure aerogel prepared under the same process conditions (which as such contradicts the mixing rules for composite materials).

The aerogel forms a clearly different structure in the pore space between the filler particles. The aerogel particles, especially RF aerogel particles, are about ten times smaller, the network is more filigree, and the specific surface area is substantially higher. If an aerogel body with this structure was prepared, it would have a very low thermal conductivity within a range of about from 10 to 50 $Wm^{-1}K^{-1}$. The fine structure of the aerogel in the interstices of the sand and hollow sphere bodies approximately corresponds to the structure of aerogels, especially RF aerogels, which must be subjected to supercritical drying. The latter have a thermal conductivity which is about 10 to 50 times lower than that of the subcritically dried aerogels, especially RF aerogels. This means that an essential element of the filler-containing aerogels according to the invention is the fact that the formation of the gel network in the small pore spaces of the fillers proceeds similarly to that in aerogels which are prepared with a large amount of catalyst and subjected to supercritical drying. With this piece of recognition, the classical mixing rules for the thermal conductivity of composite materials may again be applied.

In a further embodiment, the object of the present invention is achieved by a process for the preparation of an aerogel comprising the following steps:

a. preparation of a sol;

b. mixing the sol with a filler;

c. gelling of the sol into a gel; and d. drying of the gel.

This process is particularly advantageous if the resulting aerogel, for example, a plastic aerogel, is pyrolyzed to a carbon aerogel. An increased temperature stability is achieved thereby, inter alia.

EXAMPLE

General Information

E-Spheres™ ceramic hollow spheres of the company Envirospheres™

Alodur™ abrasive from an $Al_2O_3$ melt from the Treibacher Schleifmittel™ Corp.

Scotchlite™ glass hollow spheres of 3M™

Example 1

22 g of resorcinol, 20 ml of formaldehyde solution (37% by volume in water), 0.014 g of $Na_2CO_3$ and 82 ml of $H_2O$ are stirred at room temperature to give a resorcinol/formaldehyde sol and subsequently aged for 5 days. E-Spheres™ hollow spheres having grain sizes of from 20 to 200 μm were mixed with the aged RF sol in a proportion of 10% by volume in a mixer and dried at 40° C. with exclusion of air. The measured thermal conductivity had a value of 0.29 $Wm^{-1}K^{-1}$.

Example 2

22 g of resorcinol, 20 ml of formaldehyde solution (37% by volume in water), 0.014 g of $Na_2CO_3$ and 82 ml of $H_2O$ are stirred at room temperature to give a resorcinol/formaldehyde sol and subsequently aged for 5 days. E-Spheres™ hollow spheres having grain sizes of from 20 to 200 μm were mixed with the aged RF sol in a proportion of 30% by volume in a mixer and dried at 40° C. with exclusion of air. The measured thermal conductivity had a value of 0.27 $Wm^{-1}K^{-1}$.

Comparative Example

Pure RF aerogel according to Example 1 was prepared. A thermal conductivity of 0.35 $Wm^{-1}K^{-1}$ was found. A further comparison with modification of Alodur™, quartz and SiC sand showed that these have a clearly higher thermal conductivity. For aerogels filled with Alodur™ sand having a grain size of from 45 to 75 μm and an RF content of 4% by volume, the thermal conductivity was about 0.63 $Wm^{-1}K^{-1}$, and for an RF content of 24% by volume, this value decreased to 0.53 $Wm^{-1}K^{-1}$. On average, a value of about 0.5 $Wm^{-1}K^{-1}$ was achieved for this sand even for increasing grain sizes. A similar result was obtained for the quartz sand. For silicon carbide, values of about 1 $Wm^{-1}K^{-1}$ and more were measured for thermal conductivity on average with a comparable grain size.

Data Regarding Thermal Conductivity:

| | |
|---|---|
| Pure RF aerogel (prepared by analogy with Comparative Example) | 0.35 $Wm^{-1}K^{-1}$ |
| e-spheres ™ | 0.1 $Wm^{-1}K^{-1}$ |
| Glass hollow spheres (type Scotchlite ™) | about 0.05 $Wm^{-1}K^{-1}$ |

The invention claimed is:

1. A carbon aerogel molded part including an aerogel and formed without additional binder containing a filler including inorganic hollow spheres and having a thermal conductivity of up to 0.5 $Wm^{-1}K^{-1}$, where the pore space between the hollow sphere is completely filled by the aerogel.

2. The carbon aerogel molded part according to claim 1, wherein said aerogel further comprises silica aerogels, plastic aerogels or organic aerogels.

3. The carbon aerogel molded part according to claim 1, wherein said hollow spheres consist of glass.

4. The carbon aerogel molded part according to claim 1, wherein the thermal conductivity of the filler is up to 0.1 $Wm^{-1}K^{-1}$.

5. The carbon aerogel molded part according to claim 1, wherein said aerogel contains a filler in an amount of from about 70% to 90% by volume.

6. The carbon aerogel molded part according to claim 1, wherein the thermal conductivity of the molded part is lower than the thermal conductivity of the filler-free aerogel.

7. A process for a preparation of the carbon aerogel molded part according to claim 1, comprising the steps of: a. preparation of a sol without additional binders; b. mixing the sol with a filler including inorganic hollow spheres; c. gelling of the sol into a gel; d. drying of the gel; and e. pyrolyzing the dry gel to form the carbon aerogel molded part.

8. The carbon aerogel molded part according to claim 1, wherein said aerogel further comprises resorcinol/formaldehyde aerogels.

9. The carbon aerogel molded part according to claim 1, wherein said part is filled with at least 30% by volume carbon aerogel.

10. The carbon aerogel molded part according to claim 1, wherein said part is filled with between 30% to about 45% carbon aerogel.

11. The carbon aerogel molded part according to claim 1, wherein said hollow spheres have a diameter of about 20 to 200 μm.

* * * * *